Feb. 5, 1929.
C. A. DARR
1,701,444
BAIT SINKER AND CARRIER
Filed Dec. 19, 1927
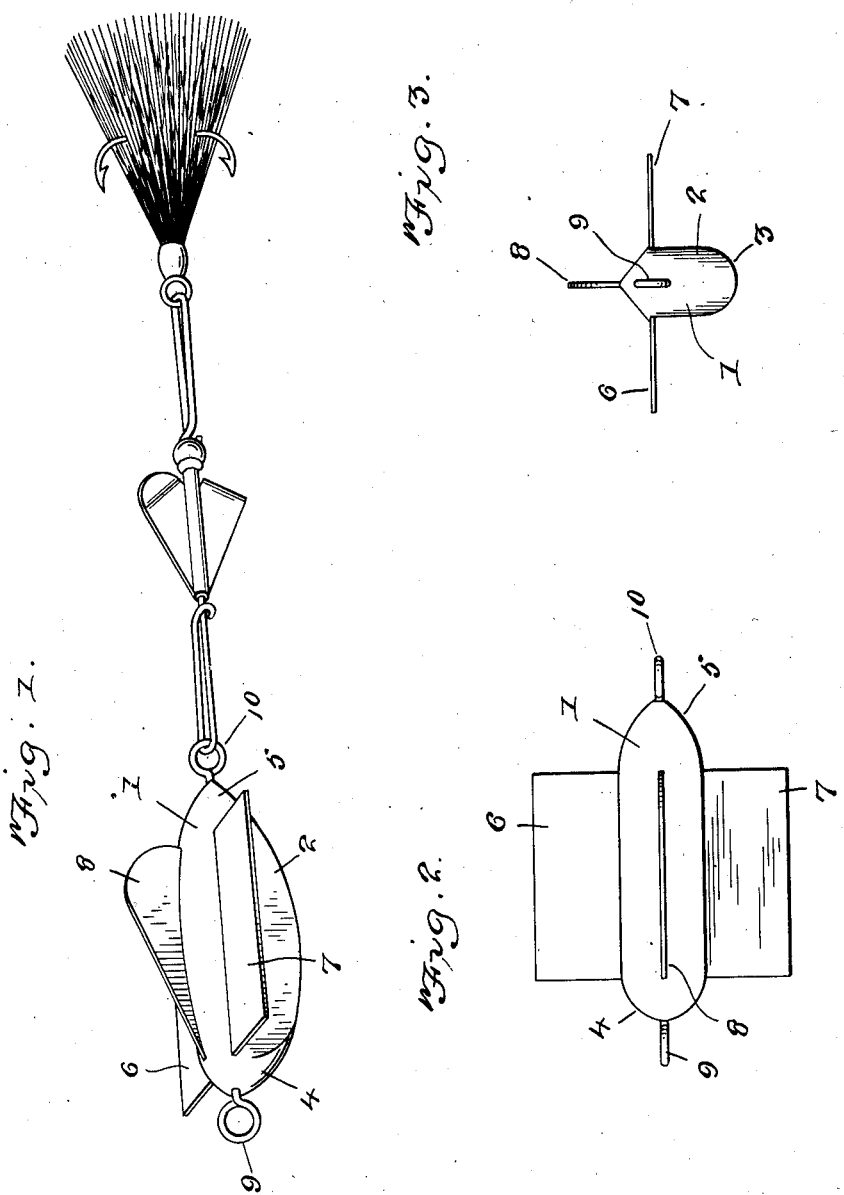
C. A. Darr
INVENTOR
BY Victor J. Evans
ATTORNEY Patented Feb. 5, 1929.

1,701,444

UNITED STATES PATENT OFFICE.

CHESTER ARTHUR DARR, OF DEL RIO, TEXAS.

BAIT SINKER AND CARRIER.

Application filed December 19, 1927. Serial No. 241,190.

This invention relates to sinkers for fishing bait, and the primary object is to provide a sinker for trolling and the like in water of any depth and one that can be associated with any type bait or lure.

A further object of the invention is to provide a sinker having vanes that can be adjusted so that the sinker can be used with advantageous results in water of various depths.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a perspective view of my sinker and showing its application to a trolling lure.

Figure 2 is a top plan view of the sinker per se.

Figure 3 is a front view thereof.

Referring to the drawings in detail the reference numeral 1 indicates the body of the sinker which is substantially elongated as shown and formed with substantially flat side walls 2 which merge into a rounded bottom 3 and substantially pointed ends 4 and 5.

Extending from opposite sides of said body adjacent the top thereof are vanes 6 and 7 which are of substantially rectangular formation as best shown in Figure 2 but it is obvious that the vanes can be of any shape without departing from the spirit of the invention. The walls of the body above the vanes 6 and 7 converge upwardly as suggested in Figure 3 of the drawings and rising from the apex of these walls is a fin 8 enlarged at its rear portion so as to provide a greater water resistance thereby. Extending from the ends 4 and 5 are eye members 9 and 10. The eye member 9 being arranged at the front end of the body, while the eye 10 extends from the rear end thereof and is adapted to receive any type bait or lure and as shown in Figure 1, the eye 10 has secured thereto a trolling lure of the usual construction.

From the above description and the disclosure in the drawings, it will be obvious that the sinker which forms the subject matter of the present invention is primarily designed for trolling, and can be used in water of any depth, the vanes 6 and 7 being formed from bendable metal so that they can be adjusted to be arranged in any plane and thereby position the sinker at the desired depth in the water.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A bait carrying sinker of the character described comprising a body having straight side walls merging into a rounded bottom, vanes extending from opposite sides of said body, converging walls formed on said body above the vanes, a fin rising from the apex of said walls and being enlarged adjacent its lower end, eye members extending from the opposite ends of said body, and said vanes being bendable as and for the purpose specified.

2. A bait carrying sinker of the character described having a body provided with substantially pointed ends, and straight side walls merging into a rounded bottom, vanes extending from opposite sides of said body which is provided with converging walls above said vanes, a fin rising from the apex of said converging walls and being enlarged adjacent the rear end thereof, eye members disposed in the pointed ends and projecting therefrom, and one of said eye members being adapted to receive a fish bait.

In testimony whereof I affix my signature.

CHESTER ARTHUR DARR.